United States Patent
Choiniere et al.

(10) Patent No.: US 9,477,633 B2
(45) Date of Patent: *Oct. 25, 2016

(54) STACKING CONNECTOR FOR MILITARY APPLICATIONS

(71) Applicant: BAE Systems Information and Electronic Systems Integration Inc., Nashua, NH (US)

(72) Inventors: Michael J. Choiniere, Merrimack, NH (US); Mark P. Devins, Nashua, NH (US); David A. Richards, Merrimack, NH (US); Kevin D. Galli, Newton, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/795,378

(22) Filed: Jul. 9, 2015

(65) Prior Publication Data

US 2015/0311647 A1  Oct. 29, 2015

Related U.S. Application Data

(63) Continuation-in-part of application No. 14/045,073, filed on Oct. 3, 2013.

(60) Provisional application No. 61/744,759, filed on Oct. 3, 2012.

(51) Int. Cl.
*H01R 13/60* (2006.01)
*G06F 13/42* (2006.01)
*G06F 1/26* (2006.01)
*H01R 13/514* (2006.01)
*H04N 5/77* (2006.01)

(52) U.S. Cl.
CPC .......... *G06F 13/4286* (2013.01); *G06F 1/266* (2013.01); *H01R 13/514* (2013.01); *H04N 5/77* (2013.01)

(58) Field of Classification Search
CPC .......................... H01R 13/518; H01R 13/659
USPC ...................................... 439/541.5
See application file for complete search history.

(56) References Cited

U.S. PATENT DOCUMENTS

| | | | |
|---|---|---|---|
| 6,913,471 B2 * | 7/2005 | Smith | H05K 1/144 439/541.5 |
| 9,350,106 B2 * | 5/2016 | Choiniere | H04N 5/77 |
| 2007/0212933 A1 * | 9/2007 | Kondou | H01R 13/6273 439/541.5 |

* cited by examiner

Primary Examiner — Phuong Dinh
(74) Attorney, Agent, or Firm — Daniel J. Long; Kimberly A. Peaslee; Scott J. Asmus

(57) ABSTRACT

An electrical connector assembly adapted for military use comprising a high-density maintenance connector which supports high bandwidth video export and low level maintenance functions, a lower density I/O connector, the stacking feature allows multiple branches in a distribution center, custom to each user, and the programmability allows for identical cables/stacking connectors to be used in different configurations.

12 Claims, 5 Drawing Sheets

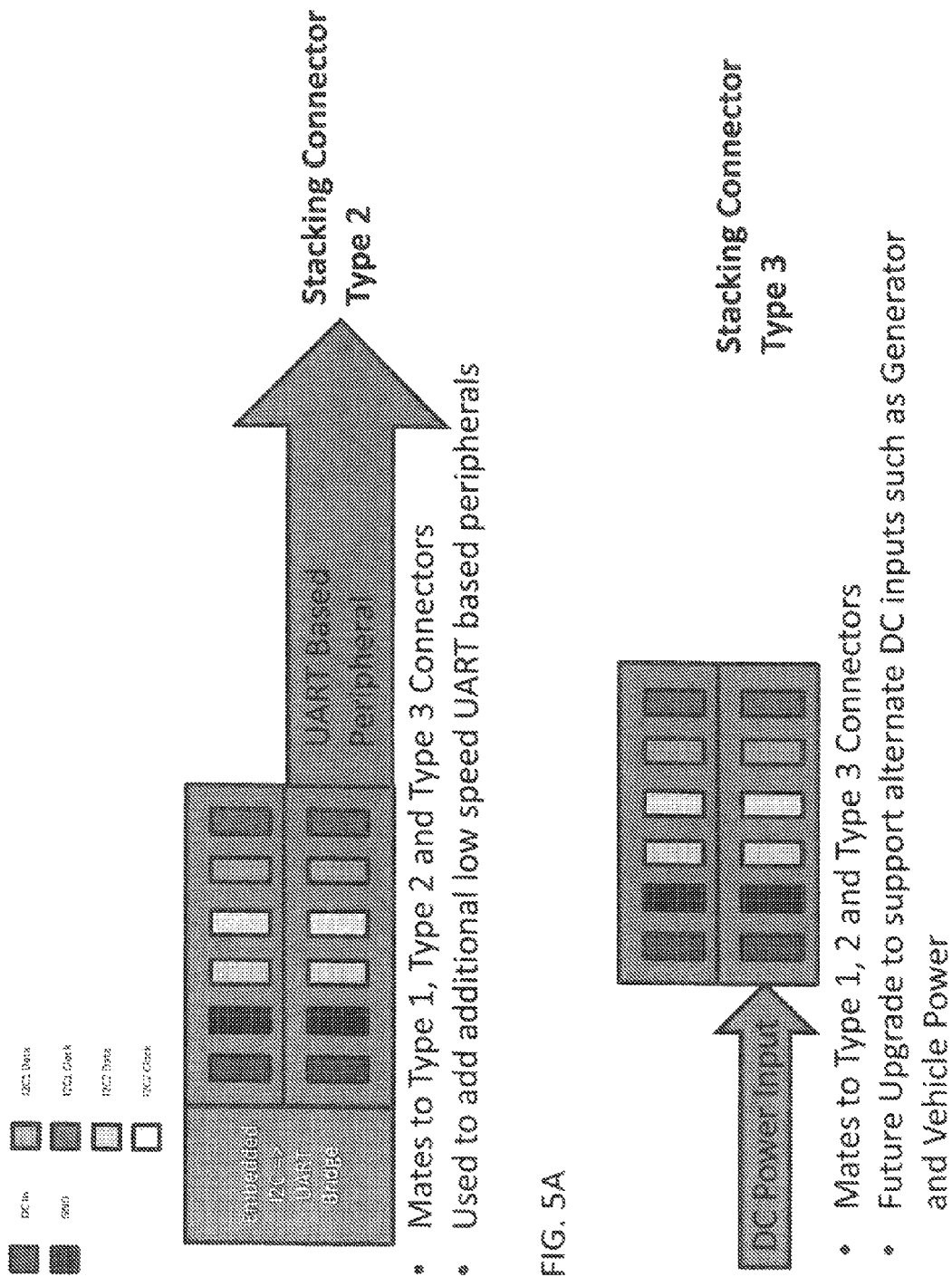

STACKING CONNECTOR FOR MILITARY APPLICATIONS

CROSS-REFERENCE TO RELATED APPLICATIONS

This is a continuation in part of U.S. application Ser. No. 14/045,073, filed Oct. 3, 2013, the contents of which are incorporated by reference herein in their entirety.

BACKGROUND OF THE INVENTION

1. Field of the Invention

The present invention relates to military electronics and more particularly to electrical connectors used in military electronics applications.

2. Brief Description of Related Art

In the prior art certain connectors used for military applications have been high-density connectors. Such high-density connectors may not be ideal for large numbers of mate/de-mate cycles as may be required for use under field conditions.

A need, therefore, exists for a connector that provides a high-density capability for certain uses but is also capable of many mate/de-mate cycles for use in the field.

SUMMARY OF THE INVENTION

The connector of the present invention retains a high density type of connector for limited functions, but is also adds a new hot shoe connector. Identified as the maintenance and soldier I/O connectors, respectively, the apportioning of functions to these connectors is based on required data rate, mate cycles, and usage conditions.

Developed from Commercial off-the-shelf (COTS) components, this device enables the user to establish mechanical and communication interfaces between the Line-Replaceable Units (LRUs) in the single action of mating them.

The maintenance connector supports high bandwidth video export and low level maintenance functions. By mating to a single cable assembly, the connector provides Camera-link video output, a Personal Computer (PC) interface and a Selective Availability Anti-spoofing Module (SAASM) key loader interface.

BRIEF DESCRIPTION OF THE DRAWINGS

The present invention is further described with reference to the accompanying drawings wherein:

FIG. 5A is a schematic drawing showing a second type of stacking connector, in accordance with a preferred embodiment of the present invention.

FIG. 5B is a schematic drawing showing a third type of stacking connector, in accordance with a preferred embodiment of the present invention.

DETAILED DESCRIPTION OF THE PREFERRED EMBODIMENT

Figures 1A, 1B:
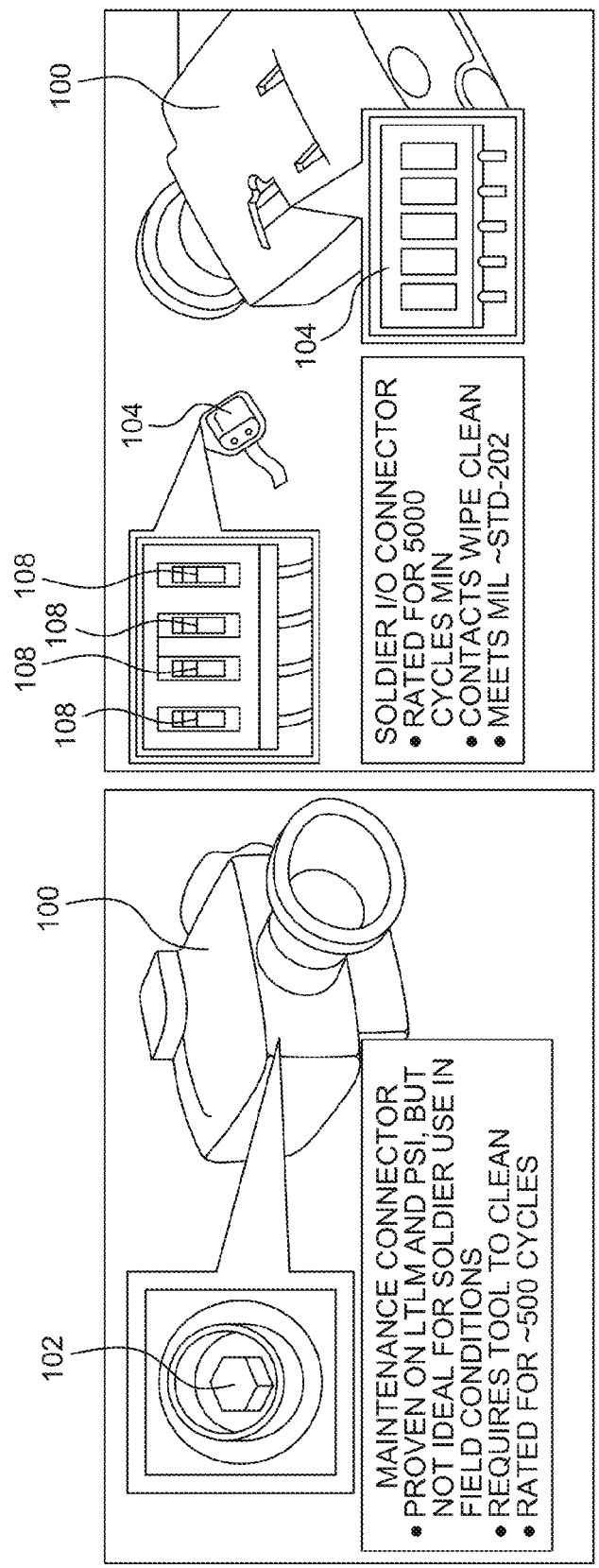
FIGS. 1A and 1B are respectively perspective views of preferred embodiments of the separate maintenance and soldier I/O connectors of the present invention.

In FIGS. 1A and 1B, there is a maintenance connector 102 on a Laser Target Locator Module (LTLM) 100 which is a high-density connector of about 40-50 pins which may be fragile and tend to break easily in the field. Often what may result is that the user has to connect to the device and usually everything comes out of the connector 102. A large distribution box is then used which then breaks out to all the other different sub-systems such as a battery, remote cable, communication device. Each branch of the armed services has different requirements with respect to devices that have to be connected which, in the prior art, meant that the distribution box had to become larger to accommodate all different possibilities. Because of this size and resulting cost, we divided the functionality of that connector 102 into two pieces. One piece, i.e. a first connector, would be used in the field and the other piece, i.e., the maintenance connector 102 at a maintenance depot where it may be possible to exercise more care in engaging connectors. FIG. 1B illustrates a 6-10 shoe connector 104 which is hot shoe and this connector is basically a slide-in type of connector, which would use 6 LANS, e.g., flat planes of copper in the connector, as shown in the art, and 6 spring contacts and you simply slide a module and it engages those 6 surfaces. The connector 104 is a low-density connector since it uses many less pins than the high-density connector having about 40-50 pins. This connector 104 has a lot of interconnect cycle time, going from 500 cycles in the first maintenance connector 102 to about 5,000 in the second connector 104 which gives it a greater longevity.

Figure 3:
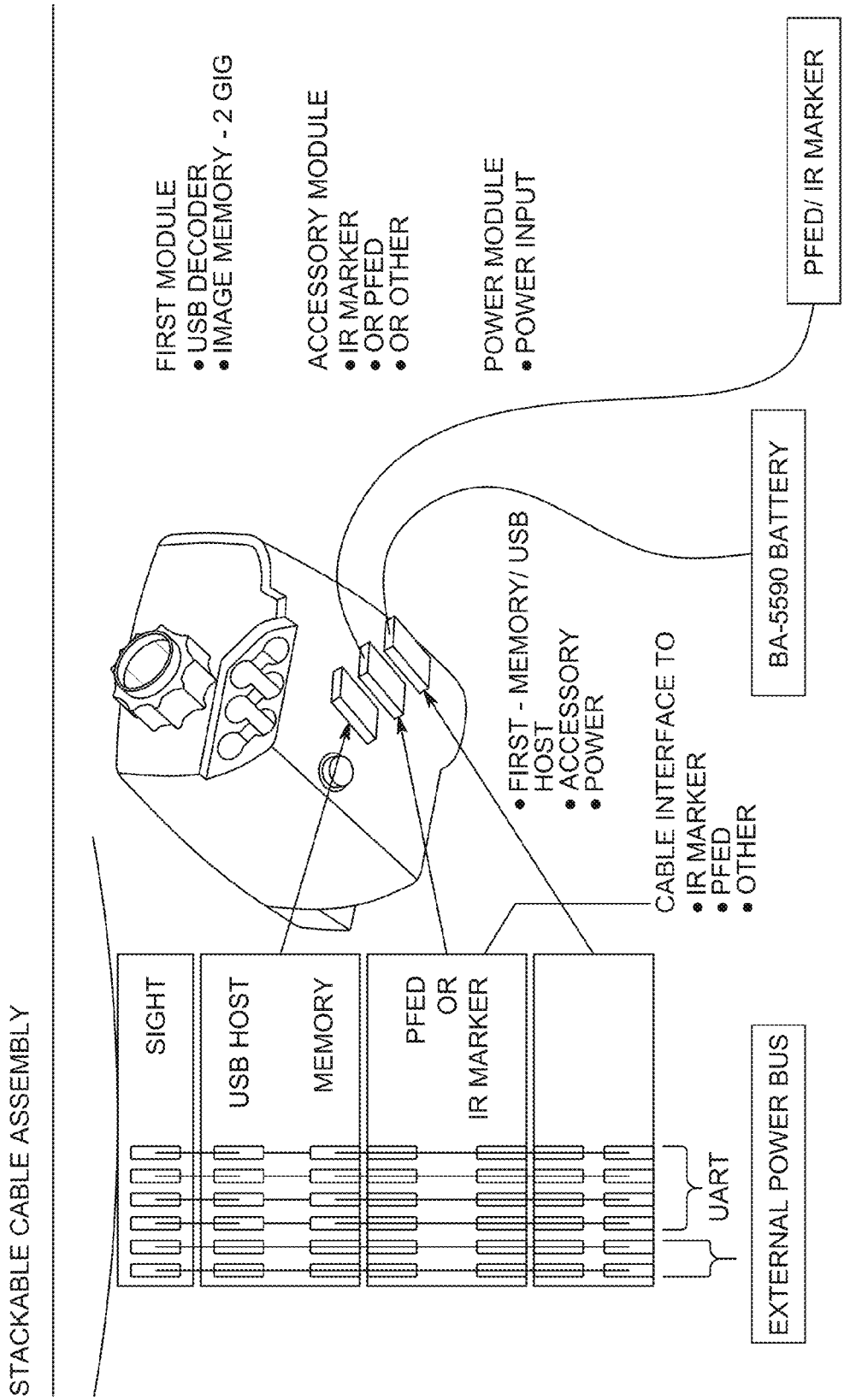
FIG. 3 is a schematic drawing showing a stackable cable assembly, in accordance with a preferred embodiment of the present invention.

FIG. 3 is a schematic drawing showing a stackable cable assembly, in accordance with a preferred embodiment of the present invention, where the 6 pins are broken up into two parts. The first two pins are used for supplying power (external power bus), and the last four pins are divided up into COMMs 108, labeled as a universal asynchronous receiver/transmitter (UART). The COMMs 108 allows us to communicate to other different parts and pieces in the field, including communications, remote connector, or anything else that has a communications device that can communicate through those four pins. Inside the unit on the other side of those four pins is a USB communication line. The first module snaps in the middle of the drawing slides in and snaps into place to the LTLM 100. It has the counterpart to the USB and allows us to do high speed data to memory devices such as a memory stick which can store pictures that the user can take off the unit and bring with him. You can also read from that memory to configure the unit so that if the user is in an Air Force, Marine or Army unit we can now reconfigure the device toward that particular branch of the service using a lookup table of configuration items and so that we can accommodate each branch of the service with respect to the way that the branch wants to operate the device. The device 100 also provides us with the ability to decide which device it would normally communicate. For example, the user could select which communication devices and what protocols would be used. Also it goes one step further, the user can now, within a particular branch of the service, configure the device to the personality of a user. Each user can set their menus up differently, they can program their systems to work a certain way. For example, when the user is on a shift, and another user is relieving him, the user can take his personality module in with him with all his information and then hand the device to the next user. The user slides his module in and his system is immediately configured to his particular usage or need. That includes also mission maps and things that are specific to the mission, e.g. specific to what will be done on the next outing. This feature allows a great deal of versatility. After that the USB hub also allows the user to hook up to it because on the far side of it there is also the same six pins again. They are stackable like poker chips and the first two pins are power and run throughout the entire architecture. Consequently the user can power into the device through an external battery or he can take power out of the device using those two pins to power up anything else so it is a complete power BUS, i.e. it is internal in and external simultaneously. The four pins now transfer basically into a serial COMM so the user may communicate to things like a remote actuator or an iron marker or a pocket-sized forward entry device (PFED) or any type of communication device to whom the user wishes to communicate with. The user can generate any protocol he needs to talk to those individual devices. An advantage of this arrangement is that these stackable connector 104 ends are all identical so as many can be attached as there are to change the connector on the far side of the cable to configure to whatever piece of equipment that may be desired. Each of these may consequently become unique to a particular branch of the armed services, a particular device, or to a particular architecture, as they simply are stacked on the bottom of the unit.

Figure 2:
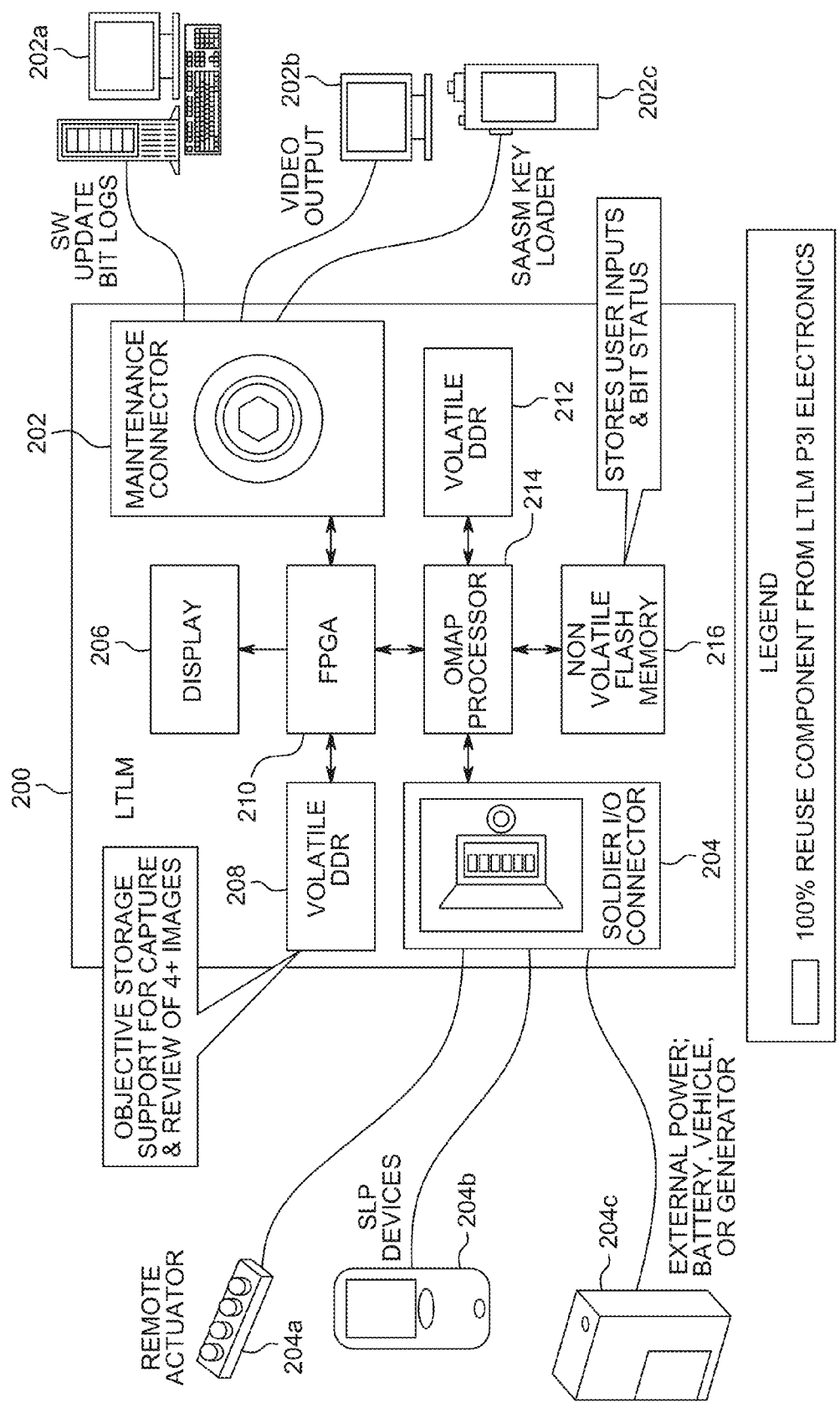
FIG. 2 is a schematic drawing showing the data/image and storage architecture of a preferred embodiment of the present invention.
Figure 4:
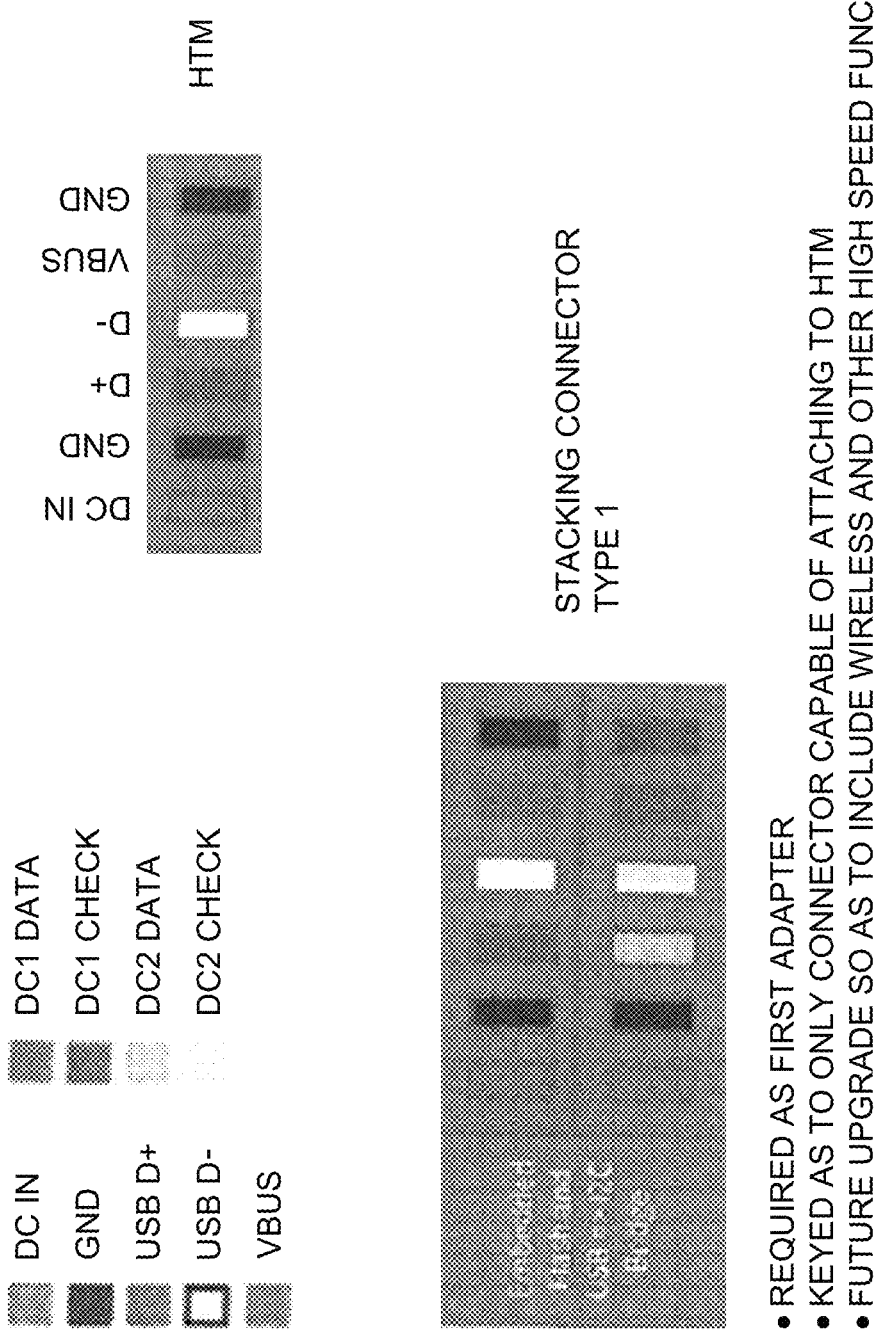
FIG. 4 is a schematic drawing showing a first type of stacking connector, in accordance with a preferred embodiment of the present invention.

FIG. 2 is a schematic drawing showing the data/image and storage architecture of a preferred embodiment of the present invention. FIGS. 4-5B are schematic drawings showing different types of stacking connectors, in accordance with preferred embodiments of the present invention. Referring to FIGS. 2-5B, the maintenance connector 202 is adapted for use with depot equipment used for calibration. The left side of FIG. 2 shows six pin connector 204 which can hook up to an external battery 204c, any service location protocol (SLP) device 204b which is basically a sensor link protocol device, and a remote actuator 204a. It can also hook up to an Infrared (IR) or any other service equipment that requires serial interface. This feature is the interface to the outside world for the user. It provides a more robust and much cleaner interface in terms of hardware as components are much lighter, smaller and tighter in terms of stacking things together and the cables become a lot easier to replace. Each cable that stacks will have an individual Internet Protocol (IP) address. It will be programmed to know that it is an IR marker cable or is a remote actuated cable. That information is fed through the BUS up to the USB so that we can address it at any time to send it messages as needed.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. An electrical connector assembly adapted for military use comprising;
   a high-density maintenance connector which supports high bandwidth video export and low level maintenance functions;
   a lower density I/O connector; wherein the high-density maintenance connector and the lower density I/O connector are stackable connectors that allow stacking multiple branches in a distribution center, customizable for each user; and the stackable connectors have identical ends that can be arranged to be used in different configurations, and wherein the lower density I/O connector has a first two pins for facilitating power function and a last four pins for facilitating communication functions for configuring a device having the electrical connector assembly.

2. The electrical connector assembly as claimed in claim 1, wherein the lower density I/O connector is a hot shoe connector.

3. The electrical connector assembly as claimed in claim 1, wherein the functions of the high-density maintenance connector and the lower density I/O connector are apportioned based on required data rate, mate cycles, and usage conditions.

4. The electrical connector assembly as claimed in claim 1, wherein the high-density maintenance connector supports high bandwidth video export and low level maintenance functions.

5. The electrical connector assembly as claimed in claim 1, wherein the lower density I/O connector has 6 LANS and 6 spring contacts.

6. The electrical connector assembly as claimed in claim 5, wherein the lower density I/O connector has 6 pins, and wherein first two pins of the 6 pins facilitate power functions and last four pins of the 6 pins facilitate communication functions.

7. The electrical connector assembly as claimed in claim 6, wherein on a second end of the last four pins is a USB communication line.

8. The electrical connector assembly as claimed in claim 7, further comprising one or more modules wherein the one or more modules are configured to be communicatively coupled with the last four pins.

9. The electrical connector assembly as claimed in claim 8, wherein the one or more modules are storage memory devices.

10. The electrical connector assembly as claimed in claim 1, wherein the device is configured based on one or more communication devices that communicate with the device and one or more protocols used for the communication.

11. The electrical connector assembly as claimed in claim 1, wherein the device is configured based on each individual user of the device.

12. The electrical connector assembly as claimed in claim 6, wherein the first two pins of the 6 pins enable taking power-in from an external battery and enables taking power-out to charge an external device.

* * * * *